United States Patent [19]

Brunt et al.

[11] Patent Number: 5,008,647
[45] Date of Patent: Apr. 16, 1991

[54] WIRELESS BICYCLE WHEEL MONITOR SYSTEM

[75] Inventors: Chris Brunt, Topanga; Don C. Carner, Jr., Oxnard, both of Calif.

[73] Assignee: Orleander S.A., Lugano-Cassarate, Switzerland

[21] Appl. No.: 430,093

[22] Filed: Oct. 25, 1989

Related U.S. Application Data

[63] Continuation-in-part of Ser. No. 306,621, Feb. 6, 1989, abandoned.

[51] Int. Cl.⁵ .............................. B62J 3/00; G01P 3/66
[52] U.S. Cl. ..................................... 340/432; 340/441; 340/462; 340/670,672; 324/168; 324/178; 324/179
[58] Field of Search ............... 340/432, 427, 441, 445, 340/447, 448, 461, 466, 671, 670, 672, 691, 462; 324/160, 164, 166, 167, 168, 171, 173–175, 178, 179

[56] References Cited

U.S. PATENT DOCUMENTS

| | | | |
|---|---|---|---|
| 3,898,563 | 8/1975 | Erisman | 324/166 |
| 4,319,220 | 3/1982 | Pappas et al. | 340/447 |
| 4,331,918 | 5/1982 | Dunch | 340/671 |
| 4,352,062 | 9/1982 | Nomura et al. | 340/670 |
| 4,352,063 | 9/1982 | Jones et al. | 340/671 |
| 4,633,216 | 12/1986 | Tsuyama | 340/432 |
| 4,780,864 | 10/1988 | Houlihan | 340/432 |

FOREIGN PATENT DOCUMENTS 2726322  6/1976  Fed. Rep. of Germany ...... 340/432

Primary Examiner—Donnie L. Crosland
Attorney, Agent, or Firm—Walter G. Marple, Jr.; Nicholas L. Coch; John E. Kidd

[57] ABSTRACT

A wireless data display system has a receiver/display unit tuned to the same frequency as a sensor/transmitter unit for monitoring wheel rotation for a vehicle such as a bicycle. The two units are preferably battery powered, and their circuits are designed for low power consumption. Both units have directed antennas positioned in alignment with each other. The receiver includes a tunable antenna to enhance signal reception and reduce sensitivity to a transmitter of an adjacent system, as well as filter and latch circuitry to reduce interference from EMI or RFI or from adjacent operation of a similar transmitter/receiver pair.

20 Claims, 4 Drawing Sheets

WIRELESS BICYCLE WHEEL MONITOR SYSTEM

This application is a continuation-in-part of U.S. application Ser. No. 07/306,621, filed on Feb. 6, 1989, now abandoned, of the same inventor.

FIELD OF THE INVENTION

The invention relates generally to instrumentalities which monitor wheel rotation, and various derivatives thereof including distance, speed and the like for a vehicle such as a bicycle.

BACKGROUND OF THE INVENTION

It is often desirable to effect electrical control of certain devices from a remote location or to sense some physical parameter at one point and to process and display the data at some remote point. For example, speed and distance data are often sensed electronically at the wheel of a vehicle and processed by a remote computer which converts time-dependent pulses from a wheel rotation sensor into instantaneous velocity or a summed measure of distance. Various means have been used to accomplish transmission of such pulse data between the remote points. Direct wiring between the sensor and the computer is commonly used, however such direct wiring is often cumbersome or inconvenient on some vehicles such as bicycles.

Bicycling computers typically employ a magnetically sensitive switch on the bicycle frame and a magnet on a road wheel. The switch/magnet pair is mounted so that the switch is closed by detection of the magnet once for each rotation of the wheel. Electrical wires connect the switch with a computer typically incorporating an oscillator, pulse detector/counter, arithmetic unit, and data storage for determining velocity, distance, or various derivatives thereof. A visual display such as an LCD is often used to present the calculated data to the user. Typical devices are shown in U.S. Pat. No. 3,898,563 to Erisman, U.S. Pat. No. 4,007,419 to Jasmine, U.S. Pat. No. 4,071,892 to Genzling, U.S. Pat. No. 4,156,190 to Chittenden, U.S. Pat. No. 4,352,063 to Jones, and U.S. Pat. Nos. 4,633,216, 4,636,769, and 4,642,606 to Tsuyama. U.S. Pat. No. 4,334,190 to Sochaczevski and U.S. Pat. No. 4,434,801 to Jimenez et al. teach similar monitoring devices. However, such devices have the problem that the wires used to connect the sensors and the computer are often aesthetically intrusive, functionally cumbersome, and subject to being damaged during use.

Some remote sensor devices utilize wireless telemetry to transmit pulse data or other signals to a processor or display unit. For example, U.S. Pat. No. 4,625,733 to Saynajakangas teaches wireless telemetry of pulse data between a user's chest and a remote display unit. However, such remote sensor devices have no particular application to the technical problems encountered in the field of cycling computers. The typical devices tend to have complex transmitter and receiver units and requisite amplifier circuits which make them undesirable for bicycling uses where low unit cost, power consumption, and size are key factors. In addition, the transmitters typically radiate signal energy over a broad three-dimensional field which makes them unsuitable for bicycling use where interference from an adjacent bicycle with a similar transmitter/receiver could produce erroneous speed and distance measurements.

Furthermore, EMI or RFI may be present in the environment where such remote control or telemetry function is desired. Such interference may be generated by electrical appliances such as televisions, computers, and monitors, anti-theft devices, motor vehicle ignition systems, etc., as well as by operation of two telemetry devices in close proximity to each other. Operation of a receiver circuit in the presence of stray RF interference would produce high, inaccurate speed readings which, over a period of time, would produce erroneous average speed, distance, and other readings.

A typical approach to such interference problems might include reprogramming the processor unit to filter or mask out signals which fall outside of acceptable limits. However, reprogramming the processor unit would involve considerable complexity and expense, and would not prevent inaccurate readings within the defined limits. In addition, such filtering or masking would not solve the problem of adjacent operation of similar transmitter/receiver units with similar operating parameters.

SUMMARY OF THE INVENTION

The invention utilizes a receiver/display unit tuned to the same frequency as a sensor/transmitter unit for monitoring wheel rotation for a vehicle such as a bicycle. The two units are preferably battery powered, and their circuits are designed for low power consumption. The receiver includes a tunable antenna to enhance signal reception and reduce sensitivity to a transmitter of an adjacent system, as well as filter and latch circuitry to reduce interference from environmental EMI or RFI or from adjacent operation of a similar transmitter/receiver pair.

In accordance with the invention, a wireless data display system, for monitoring a wheel of a vehicle such as a bicycle, comprises a transmitter unit mounted adjacent the wheel having a sensor for monitoring its rotation and generating a corresponding signal and a transmitter antenna for transmitting the signal, and a receiver unit which is visually accessible to a user remote from the transmitter unit having a receiver antenna for receiving the transmitted signal, a processor, and a display, wherein said transmitter and receiver antennas have a longitudinal axis of symmetry for signal propagation in a longitudinal direction, and means for orienting the axes of symmetry of said antennas in alignment with each other. The mutual cooperation of the sensor/transmitter unit and remote receiver/display unit having directed antennas positionable in alignment with each other provides for efficient transmission and reception of signals and avoids interference with or from an adjacent one of such systems.

In a preferred embodiment of the invention, the wireless data display system is used to monitor speed, distance, and other derivative data for a bicycle. The sensor/transmitter unit is mounted to a part of the bicycle frame adjacent one of the wheels with a pivotable part for allowing it to be aimed toward the receiver/display unit which is mounted on the handlebar and has a pivotable part for aiming it toward the transmitter unit. The receiver antenna may be a tunable antenna having a ferrite core threadably adjustable with respect to the antenna coil, for tuning to the same frequency of operation as the transmitter antenna.

In operation, the reception of a short radio-frequency pulse from the transmitter at the correct frequency, of sufficient strength, and with an acceptable inter-pulse time spacing triggers a latch of the receiver and results in the output of a well-defined data pulse to the associated cycling computer and display. An optimal receiver design employs transistors operating at low currents configured to achieve a desired level of high frequency gain, and also operate in a dual mode as amplifier/filter and monostable latch for output of the requisite data pulse.

Another aspect of the invention is the configuration of the system for low power consumption and prolonged battery life. The transmitter unit includes a sensor switch which is closed upon each rotation of the wheel, a transistor which is turned on with each closing of the sensor switch, a self-oscillating circuit for generating an oscillation signal of a selected frequency and duration for transmission when the transmitter transistor is turned on, and means for precluding generation of the oscillation signal beyond the selected duration even if the sensor switch is held closed for an extended period of time. The transmitter unit may operate in a 100–200 Khz frequency range for extremely low power requirements. The receiver unit includes an amplifier circuit coupled to the receiver antenna, an output circuit, and means for operating one stage of the amplifier circuit in a dual mode as a monostable latch to provide an output data pulse in response to the transmitted signal from the transmitter unit.

Other objects, features, and advantages of the present invention will become apparent from the following detailed description considered in conjunction with the drawings, as follows:

DESCRIPTION OF THE PREFERRED EMBODIMENTS

Figure 1:
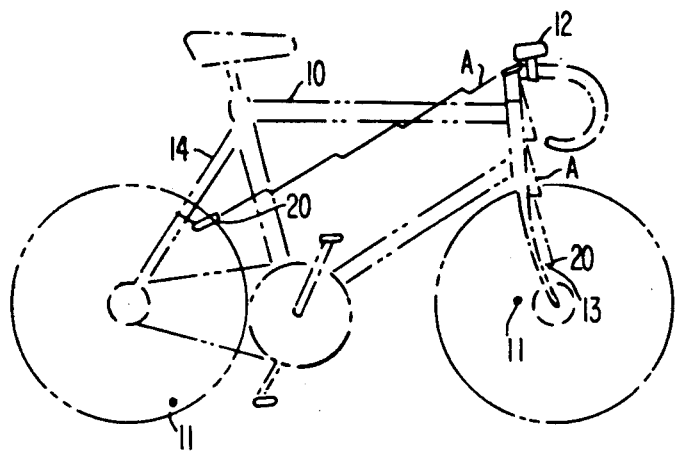
FIG. 1 is a side view showing a profile of a bicycle and depicting the mounting positions of the sensor/transmitter and receiver/display units of a wireless data display system in accordance with the invention.

Referring to FIG. 1, a wireless data display system is shown adapted for use in monitoring the speed, distance, and other derivative data for a bicycle. A bicycle frame 10 retains front and rear wheels, a pedal crank and transmission chain for driving the rear wheel, and a front steering mechanism such as conventional handlebars. A battery-powered receiver module 12 incorporating a cycling computer and a visual display is mounted on the handlebars. A battery-powered transmitter module 20 having a wheel-rotation sensor is positioned adjacent either the forward wheel or the rear wheel at the forward or aft position 13 or 14, respectively. Wheel rotation causes movement of a wheel-mounted magnet 11 which closes a switch of the sensor (to be described further) in the transmitter module 20 and causes a transmitter circuit to emit an RF pulse signal. In accordance with a principal aspect of the invention, the transmitter module 20 and receiver module 20 have directed antennas positionable in alignment with each other for efficient transmission and reception of signals for avoiding interference with similar systems on adjacent bicycles.

Figure 2:
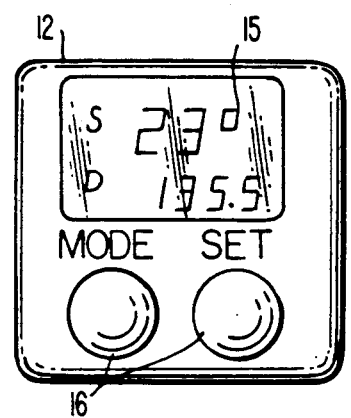
FIG. 2 is a front view of a display and program or function buttons for the wireless data display system.

In FIG. 2, the receiver module 12 is shown having a data display element 15 which is typically an LCD display showing instantaneous speed and/or distance travelled, various time functions, or derivative functions such as average speed. "Mode" and "Set" buttons 16 allow the user to switch between various display modes and to calibrate the computer, for example, by setting the size of the bicycle wheel being monitored, in order to obtain accurate speed and distance data.

Figure 3:
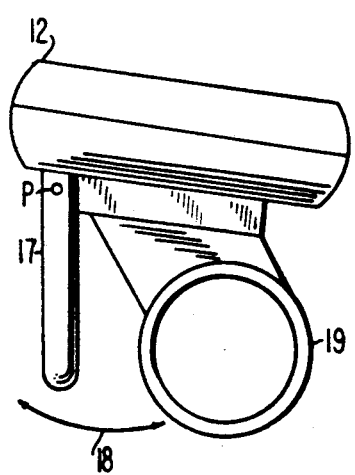
FIG. 3 is a side view of the receiver unit showing its positionable antenna.
Figure 4:
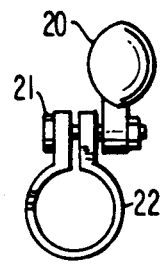
FIG. 4 is an end view of the transmitter unit showing its mounting clamp and positionable antenna.
Figure 5:
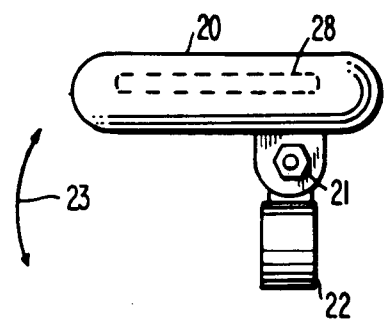
FIG. 5 is a side view of the transmitter unit.

In FIG. 3, a preferred embodiment of the receiver module 12 has a handlebar mounting clamp 19 and a receiver antenna 17 which is positionable through pivot "P" through a range of alignment angles denoted by the numeral 18 so as to coincide axially with the transmitter antenna. In FIGS. 4 and 5, the transmitter module 20 is shown having a frame mounting clamp 22 which is held in the forward or aft position 13 or 14 on the bicycle frame by means of the screw and nut 21. Loosening and tightening of the compression screw and nut 21 allows rotation of the transmitter module 20 and the transmitter antenna 28 through a range of angles 23 to facilitate axial alignment with the receiver antenna 17.

Figure 6B:
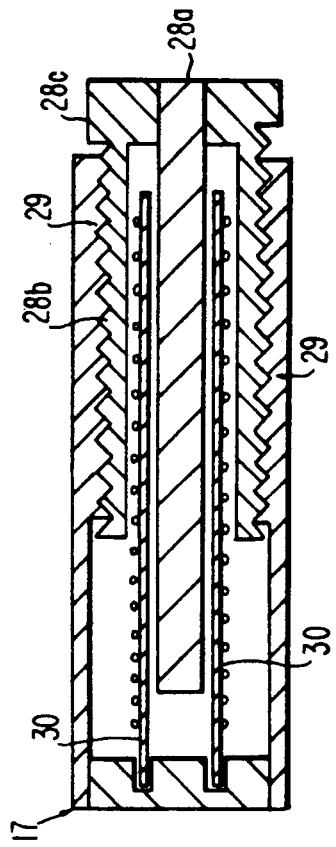
FIG. 6B illustrates a tunable antenna arrangement.
Figure 6A:
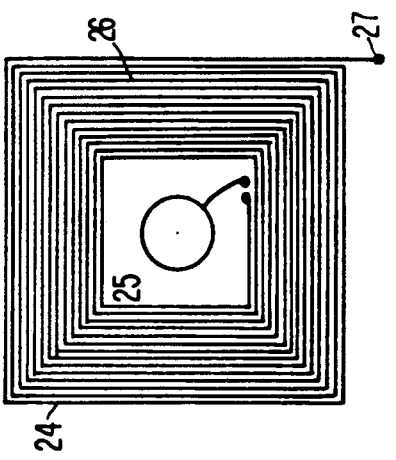
FIG. 6A is a top view of a printed circuit board carrying the transmitter or receiver antenna coil and capacitor.

In FIG. 6A, one arrangement for the transmitter or receiver antenna is shown having an etched antenna coil 24 in a spiral pattern 26 and a capacitor pad 25 on opposite sides of the board material. The diameter and number of turns of the coil and the area of the capacitor pad may be adjusted as needed to create the necessary inductance and capacitance values, respectively. In FIG. 6A, an alternative arrangement for the receiver antenna 17 allows it to be tunable to match the frequency of the transmitter antenna. The tunable receiver antenna 17 has a ferrite core 28a fixed to the threaded retainer body 28b with adjustment screw 28c. Matching screw threads 29 of the antenna housing engage the threaded retainer body 28b to permit adjustment of the longitudinal position of the ferrite core 28a relative to the antenna coil 30, which is typically wound around a support of thermoplastic material in a fixed position in the antenna housing. Adjustment of the ferrite core position changes the Q value and the inductance of the antenna. Given a transmitter of a fixed transmission frequency, such tuning or detuning of the receiver antenna allows the user to tune to the transmitter frequency and/or tune out a transmitter mounted on an adjacent bicycle. The transmitter unit may operate in a 100–200 Khz frequency range so as to require very low power from the battery.

Figure 7:
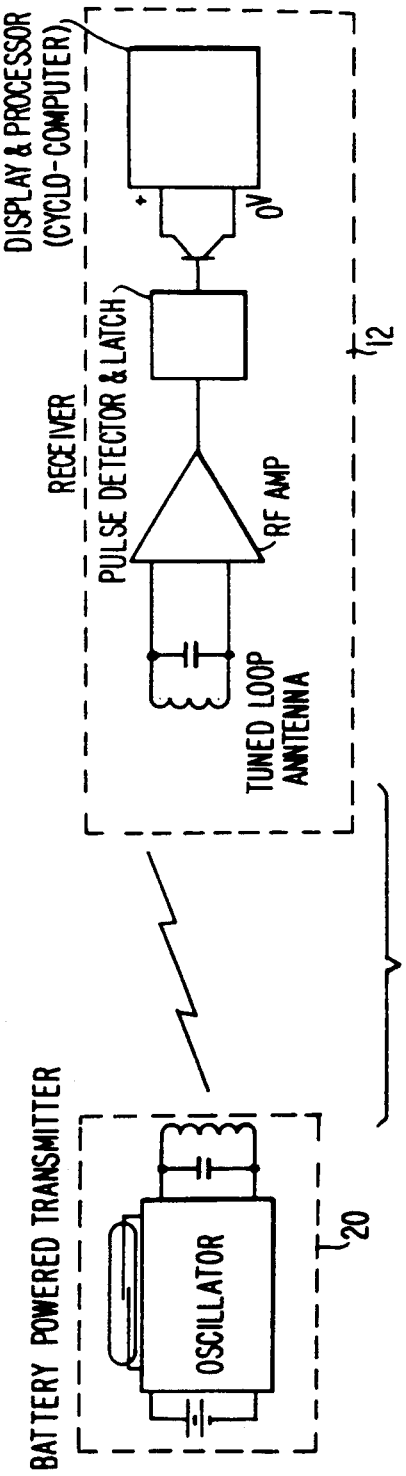
FIG. 7 is a block diagram illustrating the operation of the transmitter and receiver units.

FIG. 7 depicts the operation of the tuned transmitter 20 and receiver 12 pair. For ease of use, both units can be battery powered. The signal sent from the transmitter 20 is received, amplified, detected and fed to a latching circuit prior to being provided to a conventional cycling computer and display unit. Reception of a short radio-frequency pulse at the correct frequency and of sufficient gain to trigger a latch results in output of a well-defined, short data pulse.

Figure 8:
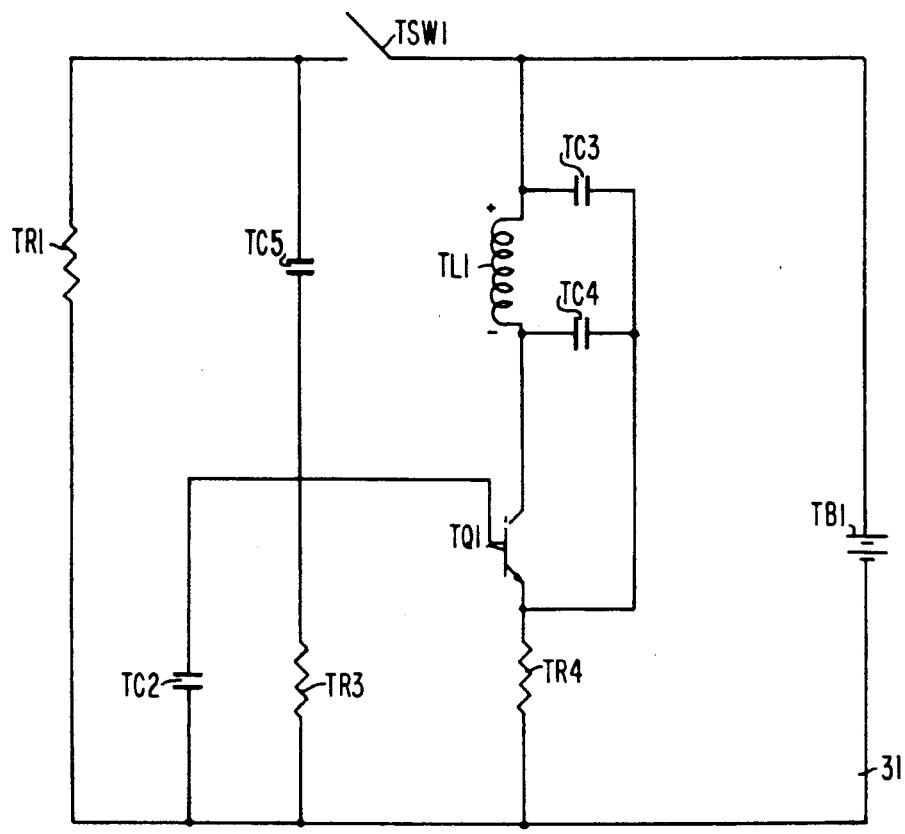
FIG. 8 is a schematic diagram of one embodiment of a transmitter circuit for the wireless data display system.

In FIG. 8, one embodiment of a transmitter circuit 31 for the battery-powered transmitter 20 is shown having a sensor switch TSW1, which may be a magnetically actuated switch such as a reed switch or a Hall effect sensor, coupled to a self-oscillating circuit comprising divider capacitors TC3 and TC4 and inductor TL1 and a single transistor TQ1 (NPN). Operation of the transmitter is effected upon a closing of the switch TSW1 to draw a current from the battery TB1 to charge the divider capacitors TC3 and TC4, which momentarily pulls the base of transistor TQ1 into a conducting state thereby causing TQ1 to turn on. Positive feedback to the emitter resistor TR4 from the divider capacitors TC3 and TC4, which along with inductor TL1 forms a resonant collector circuit, causes the circuit to oscillate at a given frequency as long as the transistor TQ1 is in the on state with sufficient gain. The transmitter antenna coil is the inductor TL1 which forms part of the resonant circuit and provides the RF signal output. The antenna may be of any design including, but not limited to, open loop wire wound, open loop double-sided printed circuit, or wire wound ferrite core.

Transistor TQ1 is turned off when the voltage to the base, connected in common node to the RC circuit formed by capacitor TC2 and resistor TR3, goes low. Capacitor TC2 becomes charged along with capacitor TC5 when the switch TSW1 is closed, and discharges through resistor TR3 when the switch is opened, thereby determining the duration of the output pulse. Capacitor TC2 and resistor TR3 help to stabilize the shape of the RF burst. The length of the output RF pulse signal is proportional to the charge stored in TC2, and is typically 20 to 60 milliseconds but may be longer if desired. The resistor TR1 provides a discharge path for the capacitor TC5 when the switch TSW1 is opened, thereby preparing the circuit for the next switch pulse. The resistor TR1 is selected to be large so that in the event TSW1 is held closed for an extended period (such as when the bicycle is at rest and the wheel magnet and sensor happen to be aligned), the drain on the transmitter battery is very low. The relative values of capacitors TC2 and TC5 allow the base voltage to go low even if the switch TSW1 is held closed.

In order to obtain extremely low current consumption, the optimum receiver circuit design will not use commercially available operational RF or IF amplifiers. Instead, low-cost, widely available, discrete transistors with good high frequency gain and impedance characteristics incorporated into a single or multiple stage amplifier/filter/latch circuit provides a preferred solution which circumvents the need to remask the cycling computer. Transistors operating at such low currents typically have poor high frequency gain and force a compromise in choice of individual operating currents and gain. In certain circumstances it might be desirable to add additional amplifier stages, while in other applications it may be advantageous to reduce the number of stages. The use of individual circuit components for dual purposes, as exemplified in the design of the amplifier/latch and detector/latch described below, results in an extremely efficient and effective receiver design.

Figure 9:
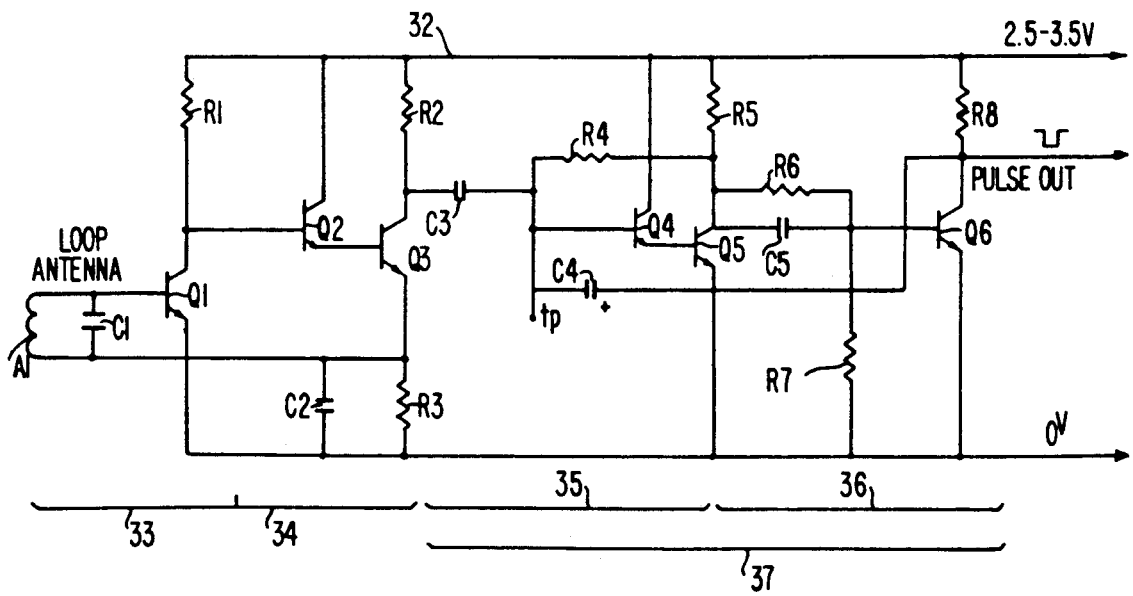
FIG. 9 is a schematic diagram of one embodiment of a receiver circuit for the wireless data display system.

In FIG. 9, one embodiment of the receiver/latch circuit 32 is comprised of five subcircuits: a tuned antenna and first stage amplifier 33; a second stage amplifier 34; an additional third gain stage 35; a pulse detector 36; and a monostable output latch 37. The power supply is indicated as a battery of 2.5 to 3.5 volts.

An incoming RF signal is received by the antenna inductor A1 which in combination with capacitor C1 forms a resonant circuit for the tuned antenna. The inductor A1 may be of any applicable design, depending upon the size and geometry and desired directionality of the receiver antenna. The signal from the resonant circuit is passed to the base of transistor Q1, which is the first stage 33 of a three-stage, high-gain, low-current amplifier. The collector current in Q1 is set low by choice of a high value collector resistor R1.

The collector output of Q1 is coupled to the transistors Q2 and Q3 of the next stage 34 which form a quasi-Darlington pair with an input impedance sufficiently high to not load the first stage. Further voltage gain is derived from the collector of Q3 with emitter resistor R3 which is AC-bypassed by capacitor C2. This stage operates under low current conditions set by the collector load resistor R2. Operating point stability is maintained with DC feedback provided to Q1 through the antenna coil A1 from the emitter of Q3

In the third stage 35, the signal from the collector load R2 of transistor Q3 is AC-coupled by capacitor C3 to the base of transistor Q4, which like Q2 is operated in the common-collector, emitter-follower mode with transistor Q5. These form another quasi-Darlington pair ensuring a high input impedance and reduced load on the output of the previous stage. The transistor pair Q4 and Q5 have two modes. In the first mode, they operate as the third-stage voltage gain amplifier 35, with DC and AC feedback from the collector of Q5 to the base of Q4 provided through resistor R4. Collector load resistor R5 establishes the low current for this stage. The gain of this amplifier stage is about 20 db with an input impedance of 100K ohms.

In the second mode, this circuit forms part of a monostable latch 37 with the transistor Q6 of the pulse detector stage 36. Transistor Q6 is biased in the normally off mode by divider resistors R6 and R7. The AC signal from the collector of Q5 coupled through the capacitor C5 to the base of Q6, if sufficiently large, causes Q6 to conduct momentarily, with feedback through capacitor C4 forcing the Q4–Q5 pair into the off mode. At this point a positive feedback condition exists between the Q4–Q5 pair and Q6, thus enhancing the latching effect as with a typical monostable latch. Capacitor C4 charges through R4 and R5, eventually allowing the Q4–Q5 pair to turn back on and return to the amplifier mode. A pulse output is obtained from the collector of Q6 with resistor R8 providing the pull-up load.

Figure 10:
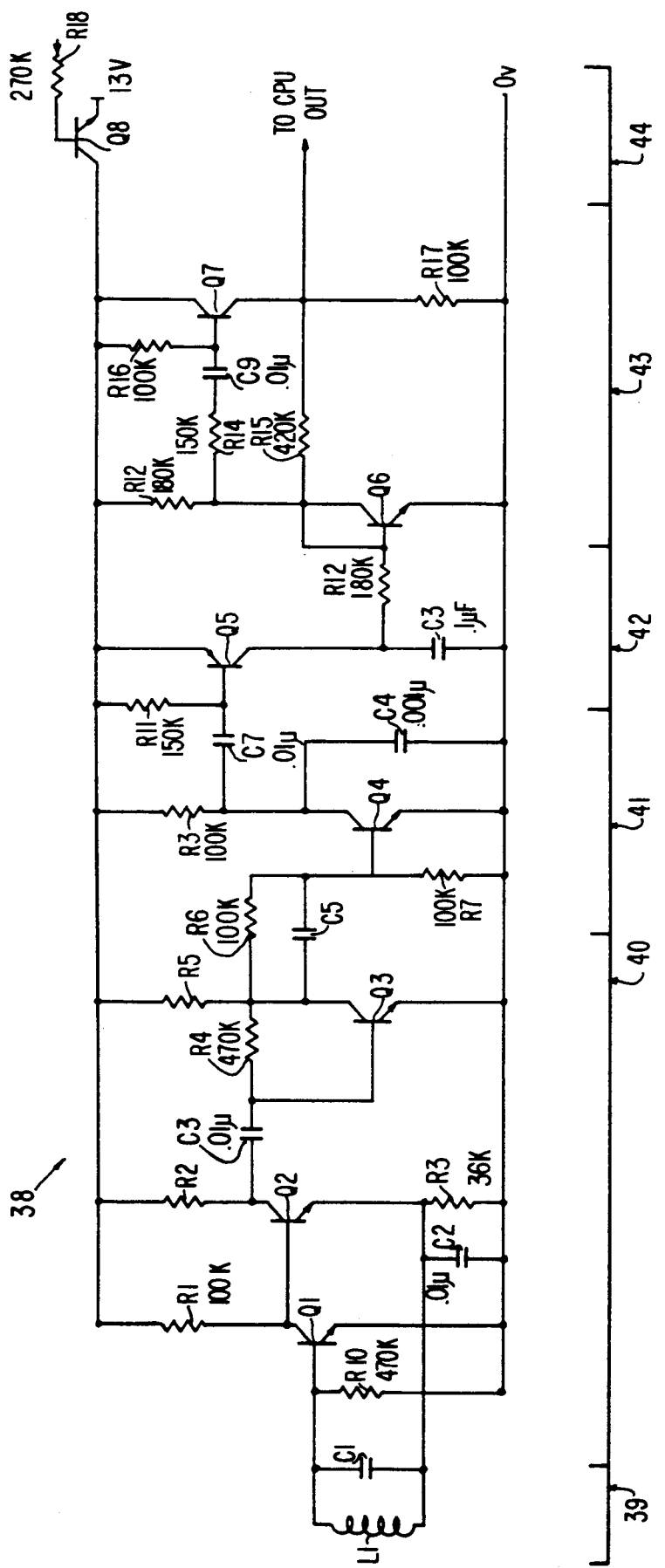
FIG. 10 is a schematic diagram of another embodiment of a receiver circuit for the wireless data display system.

In FIG. 10, another embodiment of the receiver/latch circuit 38 is comprised of six subcircuits: a tuned antenna circuit 39; a 3-stage high gain amplifier 40; a detector circuit 41; a pulse conditioner and integrator circuit 42; a pulse trigger/latch circuit 43; and a CPU "time out" interface circuit 44. In the operation of the receiver, an RF signal is received by the tuned (ferrite core) inductive element L1 which, coupled in parallel with capacitor C1, forms the resonant tuned antenna circuit 39.

The signal from the antenna circuit 39 is passed to the base of transistor Q1 (NPN) which is the first stage of the 3-stage, high-gain, low-current amplifier 30. Q1 operates in common emitter mode with low collector current being set by choice of the collector resistor R1.

This stage is DC-coupled to transistor Q2 (NPN) which also operates in common emitter mode to provide additional voltage gain. Good DC stability is maintained in these two stages by DC feedback derived from the AC-bypassed emitter resistor R3 through capacitor C2 of transistor Q2 and fed to the base of Q1 via the antenna coil. The value of R3 determines the current through Q2 and the collector resistor R2 is chosen accordingly. A high value resistor R10 between the base and emitter of Q1 provides turn-off bias for Q1 in the event the antenna coil is removed.

The signal from the collector of Q2 is AC-coupled to the base of the third-stage transistor Q3 (NPN) which like Q1 and Q2 is operated in the common emitter mode as a simple voltage amplifier. The biasing of this stage, with DC and AC feedback from the collector load resistor R5 to the base provided through resistor R4, also provides a stable temperature and supply-compensated reference voltage for the biasing of the following detector circuit 41. Considerable gain changes may be made by variation of R5 (typically values of 56K to 180K ohms). Changes in this resistor dually affect the gain of the third stage and the sensitivity of the detector circuit 41.

In the detector circuit 41, the reference voltage from the collector of Q3 is proportioned by divider resistors R6 and R7 to bias transistor Q4 (NPN) into the just-off mode. An AC signal from the collector of Q3, coupled to the base of Q4 through capacitor C5, will, if sufficiently large, cause Q4 to conduct momentarily and discharge capacitor C4 during the positive half cycles. This discharge rate is much greater than the charge rate set by the collector resistor R8 during the negative half cycles, and in effect a smooth voltage is developed across R8 in proportion to the strength of the received signal. If the received signal is in the form of a pulse, the leading edge of the pulse is differentiated by the C7/R11 capacitor/resistor combination and provides a fixed shape (amplitude and duration) spike pulse to the base of transistor Q5 (PNP) of the pulse conditioner and integrator circuit 42. Q5 conducts for a set period, regardless of signal strength, and rapidly charges capacitor C8.

In the period between pulses, C8 discharges relatively slowly through resistor R12, transistor Q6 (NPN), and resistor R15 of the pulse trigger/latch circuit 43, to a voltage dependent on the time interval between pulses down to a limit of zero volts. If the pulses arrive too rapidly, the amount of voltage change at C8 becomes too small to provide the trigger necessary to the following stage, i.e. the voltage at the base of Q6 does not have enough time to fall below the turn-off threshold of Q6. Transistors Q6 and Q7 (PNP) form a simple monostable latch with Q6 being a voltage sensitive trigger, resistor R14 and capacitor C9 providing the basic time constant, and transistor Q7 providing the output pulse. Thus, the reception of a short RF pulse at the correct frequency and of sufficient strength to trigger the detector circuit 41 results in the output of a short well-defined output data pulse at the collector of Q7, the output latch. If the rise time of the received pulse is not fast enough, the pulse differentiating circuit will ignore the received signal. If the received pulses are too closely spaced, the pulse rate filter (transistor Q5) disables the triggering of the output latch (transistors Q6 and Q7). This "signal conditioning" helps prevent false triggering due to noise or stray RF interference. The output data pulse can be used to drive many forms of associated processing circuitry. Transistor Q8 (PNP) and resistor R18 of the interface circuit 44 are used for a typical cycling computer (CPU) time out switch. The values of the components of the receiver circuit as shown in FIG. 10 are suitable for a bicycle traveling up to about 40 miles per hour.

Numerous modifications and variations are of course possible in light of the principles of the invention disclosed above. All such modifications and variations are intended to be included within the spirit and scope of the invention, as defined in the following claims.

We claim:

1. A wireless data display system for monitoring a wheel of a vehicle such as a bicycle, comprising in combination:

a transmitter unit mounted adjacent the wheel having sensor means for monitoring rotation of the wheel and generating a corresponding signal, and a transmitter antenna for transmitting the signal; and a receiver unit which is visually accessible to a user remote from the transmitter unit having a receiver antenna for receiving the transmitted signal, processing means for processing the received signal into monitoring data, and display means for displaying the monitoring data to the user, wherein said transmitter and receiver antennas have a longitudinal axis of symmetry for signal propagation in a longitudinal direction, and means for orienting the axes of symmetry of said antennas in alignment with each other, said orienting means including at least one of said transmitter and receiver units having a mounting portion which is mounted to a part of the frame provided with a pivotable part carrying the antenna for said unit for allowing it to be pivoted to a position in which its longitudinal axis is aimed in alignment with the longitudinal axis of the antenna of the other unit, whereby efficient transmission and reception of the signal is obtained and interference with or from an adjacent one of such systems is avoided.

2. A wireless data display system which is used on a bicycle having a frame, front and rear wheels, and a handlebar mounted on a front part of the frame, comprising in combination:

a transmitter unit mounted adjacent the wheel having sensor means for monitoring rotation of the wheel and generating a corresponding signal, and a transmitter antenna for transmitting the signal; and a receiver unit which is visually accessible to a user remote from the transmitter unit having a receiver antenna for receiving the transmitted signal, processing means for processing the received signal into monitoring data, and display means for displaying the monitoring data to the user, wherein said transmitter and receiver antennas have a longitudinal axis of symmetry for signal propagation in a longitudinal direction, and means for orienting the axes of symmetry of said antennas in alignment with each other, whereby efficient transmission and reception of the signal is obtained and interference with or from an adjacent one of such systems is avoided, and wherein said transmitter unit includes a mounting portion which is mounted to a part of the frame adjacent one of the wheels and a pivotable part carrying said transmitter antenna for allowing it to be pivoted to a position in which its longitudinal axis is aimed toward said receiver unit, and wherein said receiver unit includes a mounting portion which is mounted to the handlebar and a pivotable part carrying said receiver antenna for allowing it to be pivoted to a position in which its longitudinal axis is aimed toward said transmitter unit.

3. A wireless data display system according to claim 2, wherein said receiver unit includes an amplifier circuit coupled to said receiver antenna, an output circuit, and means for operating one stage of said amplifier circuit in a dual mode as a monostable latch to provide an output data pulse to said output circuit in response to the transmitted signal from said transmitter unit.

4. A wireless data display system according to claim 2, wherein said transmitter unit operates in a 100–200 Khz frequency range for extremely low power requirements.

5. A wireless data display system according to claim 2, wherein said receiver antenna is a tunable antenna having means for tuning it to the same frequency of operation as said transmitter antenna.

6. A wireless data display system for monitoring a wheel of a vehicle such as a bicycle, comprising in combination:
a transmitter unit mounted adjacent the wheel having sensor means for monitoring rotation of the wheel and generating a corresponding signal, and a transmitter antenna for transmitting the signal; and
a receiver unit which is visually accessible to a user remote from the transmitter unit having a receiver antenna for receiving the transmitted signal, processing means for processing the received signal into monitoring data, and display means for displaying the monitoring data to the user,
wherein said transmitter and receiver antennas have a longitudinal axis of symmetry for signal propagation in a longitudinal direction, and means for orienting the axes of symmetry of said antennas in alignment with each other, whereby efficient transmission and reception of the signal is obtained and interference with or from an adjacent one of such systems is avoided, and
wherein said transmitter unit includes a sensor switch which is closed upon each actuation by rotation of the wheel, a transmitter transistor which is turned on with each closing of the sensor switch, a self-oscillating circuit for generating an oscillation signal of a selected frequency and duration for transmission when the transmitter transistor is turned on, and means for precluding generation of the oscillation signal beyond the selected duration even if the sensor switch is held closed for an extended period of time.

7. In a low-power wireless data display system for monitoring rotation of an object, said system having a transmitter unit including sensor means for monitoring rotation of the object and generating a corresponding signal, and a transmitter antenna for transmitting the signal, and a receiver unit remote from the transmitter unit including a receiver antenna for receiving the transmitted signal, processing means for processing the received signal into monitoring data, and display means for displaying the monitoring data,
the improvement comprising:
said transmitter unit having a sensor switch which is closed upon each actuation by rotation of the object, a transmitter transistor which is turned on with each closing of the sensor switch, a self-oscillating circuit for generating an oscillation signal of a selected frequency and duration for transmission when the transmitter transistor is turned on, and means for turning off the transmitter transistor after the selected duration following an output pulse signal, in order to preclude generation of the oscillation signal beyond the selected duration even if the sensor switch is held closed for an extended period of time.

8. A low-power wireless data display system according to claim 7, wherein said self-oscillating circuit is a resonant circuit coupled to the collector of said transmitter transistor, and said means for precluding includes a first capacitor and a second capacitor connected in series together, a first resistor having a relatively large resistance connected in parallel with one side of the first capacitor to the sensor switch, and a second resistor connected in parallel with the second capacitor and the base of said transmitter transistor at a common node with the other side of the first capacitor, said second resistor providing a discharge path for said second capacitor to turn off the transmitter transistor, said first resistor providing a low-current path for keeping current consumption low even if the sensor switch is held closed for an extended period of time.

9. A low-power wireless data display system according to claim 7, wherein said transmitter and receiver antennas have a longitudinal axis of symmetry for signal propagation in a longitudinal direction, and wherein said system includes means for orienting the axes of symmetry of said antennas in alignment with each other, whereby efficient transmission and reception of the signal is obtained and interference with or from an adjacent, similar system is avoided.

10. A low-power wireless data display system according to claim 7, wherein said transmitter unit operates in a 100–200 Khz frequency range for extremely low power requirements.

11. In a low-power wireless data display system for monitoring rotation of an object, said system having a transmitter unit including sensor means for monitoring rotation of the object and generating a corresponding signal, and a transmitter antenna for transmitting the signal, and a receiver unit remote from the transmitter unit including a receiver antenna for receiving the transmitted signal, processing means for processing the received signal into monitoring data, and display means for displaying the monitoring data,
the improvement comprising:
said transmitter unit having a sensor switch which is closed upon each actuation by rotation of the object, a transmitter transistor which is turned on with each closing of the sensor switch, a self-oscillating circuit for generating an oscillation signal of a selected frequency and duration for transmission when the transmitter transistor is turned on, and means for precluding generation of the oscillation signal beyond the selected duration even if the sensor switch is held closed for an extended period of time, and
wherein said receiver unit includes an amplifier circuit coupled to said receiver antenna, an output circuit, and means for operating one stage of said amplifier circuit in a dual mode as a monostable latch to provide a defined output data pulse to said output circuit in response to the transmitted signal from said transmitter unit.

12. A low-power wireless data display system according to claim 11, wherein said amplifier circuit includes a pair of transistors connected in common-collector, emitter-follower configuration, and another transistor having its base AC-coupled to the collector of the second of said pair of transistors and biased in the normally off mode by divider resistors, wherein an AC signal from the collector of the second of said pair of transistors, if sufficiently large, causes said other transistor to conduct momentarily, with feedback through a capacitor forcing said pair of transistors into an off mode, whereby a positive feedback condition exists between said pair of transistors and said other transistor to provide the monostable latch.

13. In a low-power wireless data display system for monitoring rotation of an object relative to a frame, said system having a transmitter unit including sensor means for monitoring rotation of the object and generating a corresponding signal, and a transmitter antenna for transmitting the signal, and a receiver unit remote from the transmitter unit including a receiver antenna for receiving the transmitted signal, processing means for processing the received signal into monitoring data, and display means for displaying the monitoring data, the improvement wherein said transmitter and receiver units are mounted to the frame, and said transmitter and receiver antennas have a longitudinal axis of symmetry for signal propagation in a longitudinal direction, and means for orienting the axes of symmetry of said antennas in alignment with each other, said orienting means including at least one of said transmitter and receiver units having a mounting portion which is mounted to a part of the frame and provided with a pivotable part carrying the antenna for said unit for allowing it to be pivoted to a position in which its longitudinal axis is aimed in alignment with the longitudinal axis of the antenna of the other unit, whereby efficient transmission and reception of the signal is obtained and interference with or from an adjacent, similar system is avoided.

14. A wireless data display system according to claim 13, wherein said antennas are mounted to respective pivoting means for orienting the antennas in alignment with each other.

15. A wireless data display system according to claim 13, wherein said receiver antenna is a tunable antenna having means for tuning it to the same frequency of operation as the transmitter antenna.

16. A wireless data display system according to claim 13, wherein said tunable receiver antenna has an elongated ferrite core movable along the axis of symmetry of the antenna with respect to a coil, and means connected to the ferrite core for adjusting its axial position relative to the coil.

17. In a wireless monitoring system having a transmitter unit including sensor means for generating a series of sensor signals representing a phenomenon being monitored, and a transmitter antenna for transmitting the signals as a series of RF pulse signals, and a receiver unit remote from the transmitter unit including a receiver antenna for receiving the transmitted RF signals, and processing means for processing the received signals into data pulse signals, an improved receiver circuit of said receiver unit, for receiving transmitted RF signal pulses of a defined frequency, signal strength, and inter-pulse timing and for preventing false reception due to noise or stray RF interference or erroneous pulses, comprising:

an antenna circuit coupled to said receiver antenna for receiving the transmitted RF pulse signals;

an amplifier circuit coupled to the antenna circuit for amplifying the gain of the received RF pulse signals;

a pulse detector circuit, including a detector transistor having its emitter coupled to a detector capacitor connected to ground, for detecting the leading edges of the amplified pulse signals from the amplifier circuit and providing output spike pulses of a fixed shape; and a pulse trigger/latch circuit including a monostable latch formed by a first latch transistor having its base coupled through a base resistor to the common node of the emitter of the detector transistor and the detector capacitor, and a second latch transistor having its base connected through a time-constant resistor and capacitor in series to the collector of the first latch transistor and its emitter coupled through an output resistor to the base of the first latch transistor, wherein, in the period between pulses, the detector capacitor discharges relatively slowly through the base resistor, the first latch transistor, and the output resistor of the pulse trigger/latch circuit to a voltage dependent on the time interval between pulses, such that if the rise time of the received pulse signal is not fast enough, the pulse detector circuit will ignore the received pulse signal, and, if the pulses arrive too rapidly, the amount of voltage change at the detector capacitor becomes too small to provide the trigger necessary to the pulse trigger/latch circuit and disables the triggering of the latch transistors.

18. A wireless monitoring system according to claim 17, wherein said receiver antenna is a tunable antenna having means for tuning it to the same frequency of operation as the transmitter antenna.

19. A wireless monitoring system according to claim 17, wherein said tunable receiver antenna has an elongated ferrite core movable along the axis of symmetry of the antenna with respect to a coil, and means connected to the ferrite core for adjusting its axial position relative to the coil.

20. A wireless monitoring system according to claim 17, wherein said amplifier stage is a 3-stage, high-gain, low-current amplifier.

* * * * *